March 30, 1943. H. K. RICHARDSON ET AL 2,315,292
APPARATUS FOR FORMING GLASS WITH CONDUCTING MEANS MOLDED IN PLACE
Filed Oct. 15, 1938 3 Sheets-Sheet 1

INVENTORS
H. K. RICHARDSON
L. D. MORAND
BY
ATTORNEY

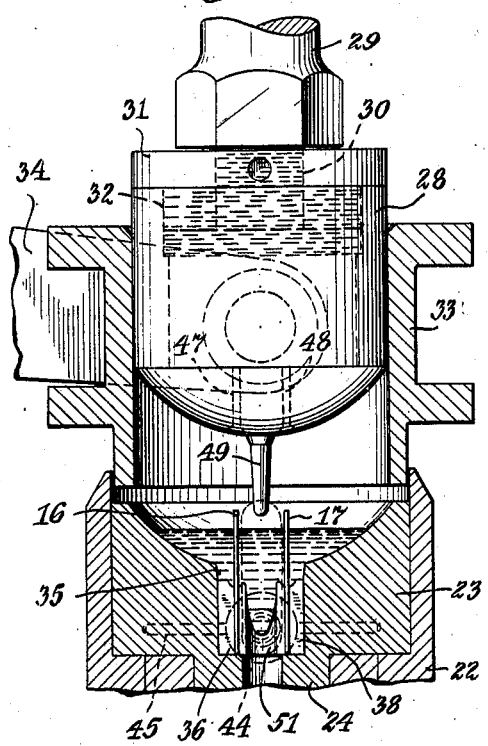
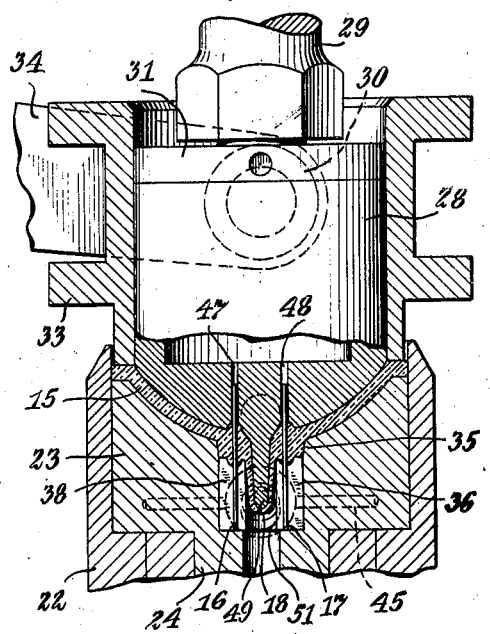
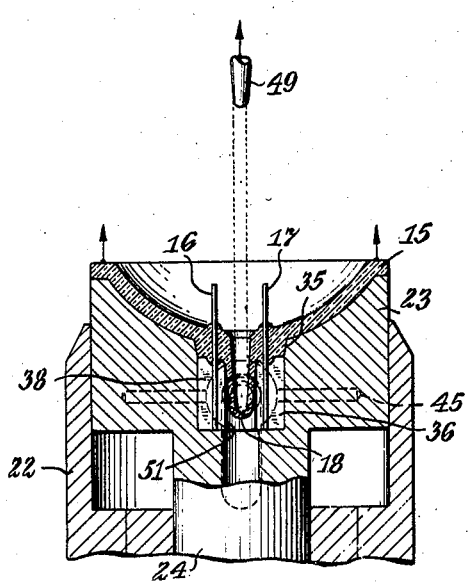
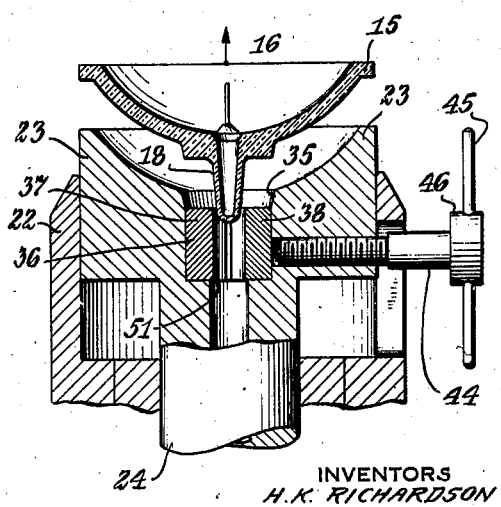
INVENTORS
H. K. RICHARDSON
L. D. MORAND

March 30, 1943. H. K. RICHARDSON ET AL 2,315,292
APPARATUS FOR FORMING GLASS WITH CONDUCTING MEANS MOLDED IN PLACE
Filed Oct. 15, 1938 3 Sheets-Sheet 3
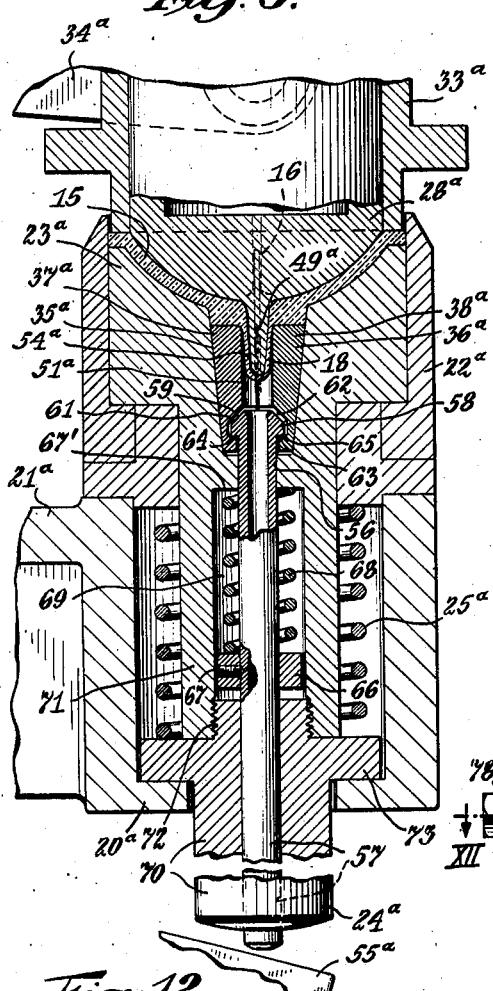
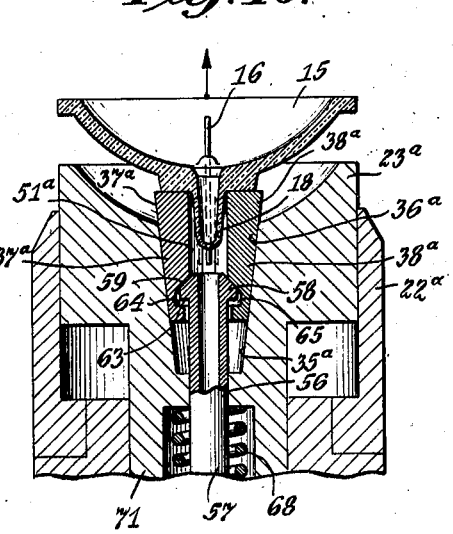
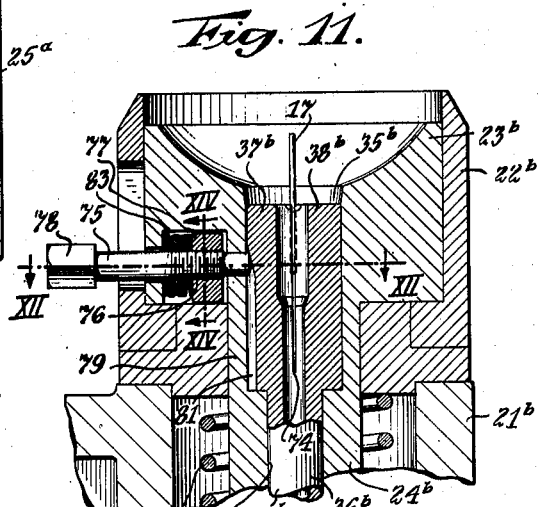
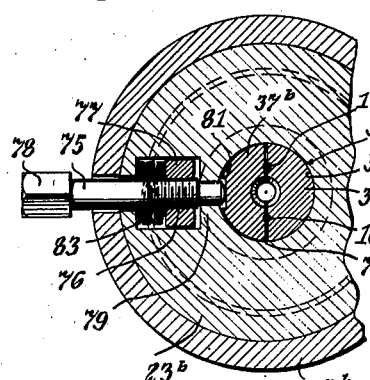
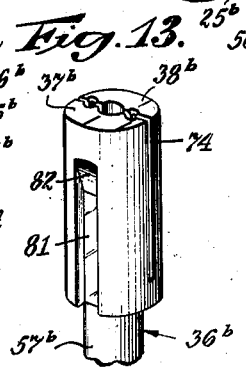
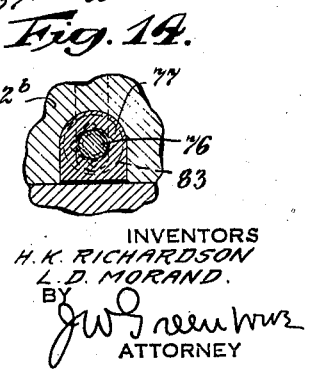
INVENTORS
H. K. RICHARDSON
L. D. MORAND.
BY
ATTORNEY Patented Mar. 30, 1943

2,315,292

UNITED STATES PATENT OFFICE 2,315,292

APPARATUS FOR FORMING GLASS WITH CONDUCTING MEANS MOLDED IN PLACE

Henry K. Richardson, Bloomfield, and Louis D. Morand, Clifton, N. J., assignors to Westinghouse Electric & Manufacturing Company, East Pittsburgh, Pa., a corporation of Pennsylvania Application October 15, 1938, Serial No. 235,158

15 Claims. (Cl. 49—66)

This invention relates to the manufacture of glass articles with conducting means molded therein and, more particularly, to the formation of glass bases for incandescent electric lamps with lead wires molded in place.

The principal object of our invention, generally considered, is the manufacture of glass articles, each having a conductor or conductors extending through a wall thereof, and molded in place during the formation of the article.

Another object of our invention is to hold the lead-in wires of lamp bases or the like in place throughout the operation of molding said bases from molten glass.

A further object of our invention is the provision of a mold element or die for holding lead-in conductors for incandescent electric lamps or the like, said die having an aperture receiving two half-round blocks with complementary wire-holding grooves formed therein, said blocks being adapted to be pressed together for holding the wires in place, or the pressure relieved to allow withdrawal of the wires therefrom after formation of the article.

A still further object of our invention is the provision of block portions with complementary grooves receiving a wire or wires for lamp bases or other glass articles, whereby said wires may be either held in place during the molding operation or released after the article molded has hardened, the means for holding said blocks being clamping screws or said blocks having tapered sides so that they may be forced together upon longitudinal movement thereof with respect to the associated die element, said blocks as an alternative, being formed by slitting the end of a pin fitting in a central aperture in a die element, so that when said slit-end portion is in normal position, the wire or wires, is or are, loosely received therebetween; whereas when said block is moved longitudinally, a tapered side portion engages a cam element to move the separated portions together and grip the wire or wires tightly therebetween.

Other objects and advantages of the invention, relating to particular arrangement and construction of the various parts, will become apparent as the description proceeds.

Referring to the drawings:

Fig. 6 is a view corresponding to Fig. 5, but showing a subsequent position where the upper die or mold element has actually reached its lowermost position and caused the glass to completely fill the space between the mold elements, in order to form the desired glass part.

Fig. 7 is a fragmentary view corresponding to Fig. 6, but showing a subsequent position where the upper die or mold element has been removed, and the lower die or mold element raised to lift the molded glass part to a position where it may be removed from the die.

Fig. 8 is a view corresponding to Fig. 7, but showing a subsequent position in which the pressure on the half-round blocks has been relieved, to release the lead wires clamped therebetween, and the glass base illustrated has been actually raised from the position where it is formed.

Fig. 9 is a view corresponding to Fig. 6 but showing a modification.

Fig. 10 is a fragmentary view corresponding to Fig. 9, but showing a subsequent position of the parts in which the glass article has actually been raised from the lower mold element or die and is ready to be taken out of the machine.

Fig. 11 is a fragmentary view corresponding generally to Fig. 2, except that no glass is shown in the die, illustrating a further embodiment of our invention.

Fig. 12 is a fragmentary horizontal sectional view on the line XII—XII of the Fig. 11, in the direction of the arrows.

Fig. 13 is a perspective view of the central die element or block, which holds the lead-in conductors during the process of molding.

Fig. 14 is a fragmentary vertical sectional view on the line XIV—XIV of Fig. 11, in the direction of the arrows.

Fig. 15 is a vertical sectional view of means for feeding, and controlling the temperature of, a stream of molten glass to a mold.

Figure 1:
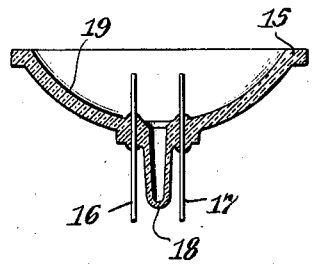
Fig. 1 is a vertical sectional view of the reflector or base portion of a lamp embodying our invention.

Referring to the drawings in detail, and first considering the embodiment of our invention illustrated in Figs. 1 to 8, inclusive, and 15, there is shown a glass lamp base or reflector portion 15 comprising lead-in conductors 16 and 17 and an exhaust tube 18, all parts of which are molded in place, as will be explained in connection with the succeeding figures. The inside surface of the base or reflector portion of the lamp bulb may, at a suitable time, be coated with a light reflecting material such as a layer 19 of aluminum or silver, as will be understood. The cover portion or remainder of the lamp, not shown, may be secured thereto in any suitable manner, as disclosed, for example, in the Richardson application, Serial No. 224,287, filed August 11, 1938, and owned by the assignee of the present application.

Figure 2:
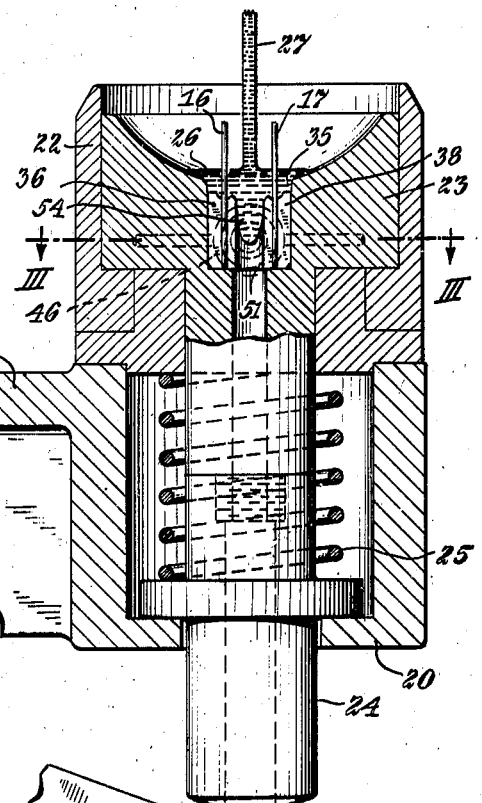
Fig. 2 is a vertical sectional view of the lower die or lower portion of a mold in which the reflector or base portion shown in Fig. 1 may be formed or cast, illustrating the process of filling the mold by means of a stream of molten glass.

Figs. 2 to 8, inclusive, and 15, show apparatus which may be employed for molding glass articles with a wire or wires in place, as for example, glass bases or reflector portions for lamps such as illustrated in Fig. 1. In the Richardson application above referred to, a method and apparatus for molding such articles has been disclosed and the present application covers an improvement thereover in order to provide for holding the lead-in conductor or wires, and releasing them at the proper time. A table or support is fragmentarily indicated at 21, and mounted thereon is a mold guiding member 22, in which is slidably mounted a lower mold element or die 23 having a portion 24 extending downwardly therefrom and normally acted on by a coil spring 25 to hold it in its lowermost or normal position in engagement with the abutment 20 as shown in Fig. 2, where it is adapted to receive molten glass 26, as from a stream 27 flowing freely like water and issuing from a furnace 40 holding glass at or near its fining temperature of say about 1300° C. The die 23, guide 22 and associated parts are desirably formed of steel or similar material.

In order to accurately predetermine the amount of glass fed to the lower die or mold element 23, we desirably cause the stream 27 to issue through an orifice provided with a die 50, which is preferably formed of an alloy of platinum-rhodium, such as described and claimed in the Richardson copending application, Serial No. 227,170, filed August 27, 1938, now Patent No. 2,190,296, granted February 13, 1940, and owned by the assignee of the present appplication and Baker and Co., Inc.

The temperature of the glass stream is desirably maintained uniform by sighting a radiation pyrometer 60 thereon, and controlling the heat of the furnace by means of apparatus such as described and claimed in Patent No. 2,116,450, dated May 3, 1938, and owned by the assignee of the present application, so that an accurately controlled amount of glass may be fed to each mold as it passes under the stream 27.

Figure 3:
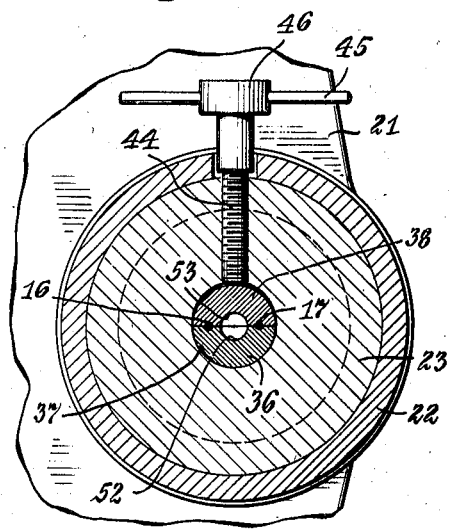
Fig. 3 is a horizontal sectional view of the lower die and its guide, on the line III—III of Fig. 2 in the direction of the arrows.
Figure 4:
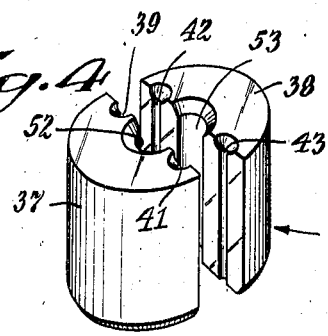
Fig. 4 is a perspective view of the two half-round blocks with wire-holding grooves, forming part of the apparatus illustrated in Figs. 2 and 3.

In order to make the reflector or base forming operation continuous, we desirably have a series of molds such as shown in Figs. 2, 3 and 4, and cause the same to move under the stream of glass one by one to each receive the charge required and then pass on to make way for the next mold, in a manner such as described and claimed in the copending application of Richardson et al., Serial No. 205,180, filed April 30, 1938, and owned by the assignee of the present application. When the glass has risen to the proper level in the die 23, the stream 27 is cut off, or the die moved from thereunder, and the upper die or mold element 28 moved into operative relation with said die 23, through the position illustrated in Fig. 5 to that of Fig. 6. The die 28 is actuated by power operated member 29 connected thereto, as by means of a threaded portion 30 on the member 29 passing through the cap portion 31 of the upper die 28, which is secured thereto by means of thread 32. The upper die 28 desirably reciprocates in a guide 33 acting as a stripper, and mounted on the end of an operating lever 34, and which guide is adapted to move into and out of operative relation with respect to the lower guiding member 22.

In order to properly form the base or reflector portion 15 with one or more lead wires 16, 17, the lower mold element or die 23 is formed with a central aperture or cavity 35 which receives lead-in-wire holding means 36, which in the present embodiment takes the form of two half-round blocks 37 and 38, each of which is provided with a pair of wire-holding grooves, those in the block 37 being designated by the reference characters 39 and 41, and those in the block 38 being designated by the reference characters 42 and 43. The grooves 39, 41, 42 and 43 are of such depth, as compared with the diameter of the lead-in conductors 16 and 17, that when the blocks are pressed together they tightly clamp said conductors and hold them in place. For the purpose of holding said blocks in the cavity 35 and in gripping relationship with respect to said conductors, we provide a clamping screw 44, threadably engaging the die 23, and operable by means of a lever 45 passing through a head 46 thereof, the inner end of said screw engaging one of the blocks 37 and 38 and adapted to force it into tight engagement with the other block, thereby enabling an operator to hold the associated wires tightly in place therebetween.

Figure 5:
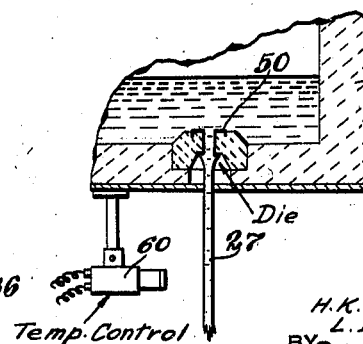
Fig. 5 is a fragmentary view corresponding to Fig. 2 but showing a subsequent position where the glass stream has been cut off and the upper die or mold element moved downwardly toward operative position with respect to the lower die or lower portion of the mold, to cause the glass to rise and completely fill the same.

The upper die or mold element 28 is likewise formed with apertures or cavities 47 and 48, as illustrated, which receive the upper end portions of the lead wires 16 and 17 which extend above the glass received in the lower die or mold element 23, as shown in Fig. 5. The upper die or mold element 28 also has a downwardly extending projection 49 which fits, with clearance corresponding with the desired wall thickness, the upwardly opening pocket or cavity 51 in the lower die or mold element 23, defined by the corresponding grooves 52 and 53 in the blocks 37 and 38, thereby serving to form the exhaust tube portion 18 in the base or reflector element 15.

The method of forming the base or reflector portion 15 is clearly illustrated in Figs. 2 to 8, inclusive. In accordance with Fig. 2 the lower mold is being furnished with a measured quantity of glass 26 from the stream 27, which glass flows around the upwardly extending portions of the wires 16 and 17, the lower portions of which are clamped between the die blocks 37 and 38 by means of the screw 44. This screw 44 not only serves to hold the die blocks in clamping relationship with the leads 16 and 17, but also to hold said blocks in position with respect to the lower die element 23. The central aperture 51 through said blocks allows some of the glass to run thereinto, as indicated by the reference character 54, in order to supply material for an exhaust tube portion.

In Fig. 5, the upper mold guide or stripper 33 has been shown moved downward into operative relationship with the lower mold element or die 23 by its operating arm 34, the upper mold element or die 28 being shown in the process of descent in the guide 33, Fig. 6 showing it in its lowermost position where the glass 26, after cooling, during the interval subsequent to delivery, to a working temperature, of possibly about 1100° C., has been squeezed upwardly to completely fill the mold, while the depending glass portion 54 has been expanded by the projection 49 of the upper mold element to form a hollow exhaust tube portion 18. As the mold element or die 28 descends, the upper portions of the leads 16 and 17 pass into the downwardly opening cavities 47 and 48 of said die as shown most clearly in Fig. 6.

After the glass has hardened sufficiently so that it will retain its shape, the upper die or mold element 28 is withdrawn, as illustrated in Fig. 7, and the lower die 23 moved upwardly against the action of the spring 25 by any desired means as, for example, the cam track 55, so that the molded glass member 15 is above the upper edge of the guide 22, and may be removed from the die 23, as shown in Fig. 8, after release of the lower portions of the lead wires 16 and 17, by turning the clamping screw 44 to the release position, illustrated in the said latter figure. The blocks 37 and 38 may be allowed to remain in the cavity 35 in the die 23.

Referring now to the embodiment of our invention illustrated in Figs. 9 and 10, there is shown, as in the previous embodiment, a fragmentary portion of a table or support 21ª. Mounted thereon is a mold guide member 22ª in which slidably moves a lower mold element or die 23ª. The die 23ª has portion 24ª extending downwardly therefrom, and normally acted on by a coil spring 25ª to hold the die 23ª in its lowermost or normal position, as shown in Fig. 9, where it is adapted to receive molten glass from the furnace 40, like the die 23 of the preceding embodiment.

As in the preceding embodiment, an upper die or mold element 28ª is provided, actuated by a power operated member, not shown, and reciprocating in a stripper guide 33ª mounted on the end of an operating lever 34ª, which guide is adapted to move into and out of operative relation with respect to the lower guiding member 22ª.

In the present embodiment, means for holding one or more lead-in conductors or wires in place, different from that of the first embodiment, are provided, in order to adapt the mechanism for automatic operation. For that purpose, the lower mold element, or die 23ª, is formed with a central, partially cylindrical, but tapering cavity 35ª terminating in a generally cylindrical, but smaller aperture 56 and receiving lead-in wire holding means 36ª. The conductor-holding means of the present embodiment takes the form of two half-round but tapered blocks 37ª and 38ª, said blocks having their opposite outer surfaces cylindrically curved to fit the engaging cylindrical surfaces on the tapered cavity 35ª, but being generally wedge-shaped so that when they fit together they may be moved downwardly into wedging engagement with one another, as shown in Fig. 9, or upwardly to releasing position as shown in Fig. 10.

Each of the blocks, 37ª and 38ª, is provided with a pair of conductor-holding grooves, like those of the embodiment of Figures 2 to 8, inclusive, said grooves being of such depth, as compared with the diameter of the lead-in conductors 16 and 17 of the base 15 shown in Fig. 1, if such a device is to be made in the mechanism of Figs. 9 and 10, that when the blocks are placed together, as by being pulled downwardly in the cavity 35ª, they tightly clamp said conductors and hold them in place, while release of said conductors is effected upon upward movement of said blocks in the cavity.

For the purpose of holding the blocks 37ª and 38ª in gripping relationship with said conductors, we provide a rod 57 having a head 58, the upper surface of which is wedge shaped, frusto-conical, or tapered, as indicated at 59, for engagement, with correspondingly inclined surfaces 61 and 62 on the blocks 37ª and 38ª, for forcing them away from one another upon upward movement. The lower surface 63 of the head 58 engages corresponding shoulders 64 and 65 on the blocks 37ª and 38ª, respectively, for holding said blocks in lowered position where they tightly clamp the wires 16 and 17.

In order to normally hold said blocks in clamping relation with respect to said wires, the rod 57 is provided with a collar 66 clamped thereon by means of a set screw 67, and normally engaged by a coil spring 68 acting between it and an abutment 67' on the extension 24ª from the lower die 23ª. In order to provide for access to the pocket 69 in which the coil spring 68 is received, the lower portion of the extension 24ª, designated by the reference character 70, is made detachable, as by causing it to threadably engage the integral portion 71 as indicated at 72, said detachable portion 70 being provided with an integral collar 73, normally held in engagement with the abutment portion 20ª of the support 21ª, as in the preceding embodiment. By virtue of the spring 68, the rod 57 normally pulls the blocks 37ª and 38ª downwardly into gripping engagement with the wires 16 and 17 disposed therebetween.

The upper die or mold element 28ª is likewise formed with apertures or cavities as in the preceding embodiment, to receive the upper-end portions of the lead-wires 16 and 17 which extend above the glass received in the lower die or element 23ª, as shown in Fig. 9. The upper die or mold element 28ª also, desirably, has a downwardly extending projection 49ª which fits, with clearance corresponding with the desired wall thickness, the upwardly opening pocket or cavity 51ª in the lower die or mold element 23ª, defined by corresponding grooves in the blocks 37ª and 38ª, as in the preceding embodiment, thereby forming the exhaust tube portion 18 of the base or reflector element 15.

Glass articles, such as shown in Fig. 1, may be formed in the apparatus of Figs. 9 and 10 as follows:

A measured quantity of glass is fed to the lower mold element 23ª, in the same manner as illustrated in Figs. 2 and 15, while the lead wires 16 and 17 are held with their lower portions clamped between the blocks 37ª and 38ª by the rod 57 acting downwardly thereon, under the influence of the spring 68. In automatic operation, the blocks will separate at pin or lead-in wire filling position and close prior to glass filling, again separating at the ejecting position. The central aperture 51ª, defined by the blocks, allows some of the glass to run thereinto, as indicated by the reference character 54ª, in order to supply material for an exhaust tube portion. In Fig. 9, the upper mold 28ᵃ and guide 33ᵃ are shown after downward movement, into operative relationship with the lower mold element or die 23ᵃ, the guide for said upper mold element being shown with its lower end received in the upper end of the lower die guide 22ᵃ.

The descent of the upper mold element 28ᵃ and its guide 33ᵃ into the position shown in Fig. 9 squeezes the glass in the lower die element 23ᵃ upwardly, to completely fill the mold, while the depending glass portion 54ᵃ is expanded, by the projection 49ᵃ of the upper mold element, to form a hollow exhaust tube portion 18. As the mold element or die 28ᵃ descends, the upper portions of the leads 16 and 17 pass into the downwardly opening cavities, as described in connection with the preceding embodiment.

After the glass has hardened sufficiently, the upper die or mold element 28ᵃ is withdrawn, and the lower die moved upwardly against the action of the spring 25ᵃ by any desired means as, for example, the cam track 55ᵃ, until the molded glass member 15 is above the upper edge of the guide 22ᵃ, and may be removed from the die 23ᵃ as shown in Figure 10. The removal is facilitated by a corresponding, but slightly greater, upward movement of the blocks 37ᵃ and 38ᵃ due to the action of the cam on the lower end of the rod 57, which also simultaneously accomplishes a release of the lower portions of the leads 16 and 17, as well as raising the glass member 15 from the lower die member 23ᵃ, as illustrated.

Referring now to the embodiment of our invention illustrated in Figures 11 to 14 inclusive, there is shown, as in the previous embodiments, a fragmentary portion of a table or support 21ᵇ. Mounted thereon is a mold guide member 22ᵇ in which reciprocates a lower mold element or die 23ᵇ. The die 23ᵇ has a portion 24ᵇ extending down therefrom, and normally acted on, as in the preceding embodiments, by coil spring 25ᵇ, to hold the die 23ᵇ in its lowermost or normal position, as shown in Figure 11, where it is adapted to receive molten glass from the furnace 40 shown in Fig. 15, like the dies 23 and 23ᵃ of the preceding embodiments.

An upper die or mold element and stripper guide therefor are provided, as in the preceding embodiment, but, inasmuch as they may be identical with those elements previously disclosed, they are not again illustrated.

In the present embodiment, we provide means for holding one or more lead wires in place, different from that of the preceding embodiments, representing, however, only a relatively slight change from that of the embodiment of Figures 9 and 10, and, being likewise adapted for automatic operation.

As in said preceding embodiment, the lower mold element or die 23ᵇ is formed with a central cylindrical pocket or cavity 35ᵇ, terminating in a generally cylindrical but smaller aperture 56ᵇ, and receiving lead-in-wire holding means 36ᵇ. The wire holding means of the present embodiment takes the form of a rod 57ᵇ with an enlarged or headed upper end, bifurcated by slitting to provide the wire-gripping elements 37ᵇ and 38ᵇ.

Each of the elements 37ᵇ and 38ᵇ is provided with a pair of wire-holding grooves like those of the preceding embodiments, said grooves being of such depth, as compared with the diameter of the lead-in conductors 16 and 17 of the base 15, shown in Figure 1, if it is desired to make such devices, that when said elements are squeezed together to close or partially close the separating slot 74, they tightly clamp said conductors and hold them in place. Release of said conductors, is effected by the resiliency of the material, desirably steel or other similar material, forming the holding means 36ᵇ, upon release of the pressure.

For the purpose of holding the elements 37ᵇ and 38ᵇ in gripping relationship with the conductors, we provide a pressure bolt 75, threaded as indicated at 76 to a receiving nut 77 and provided with an outwardly disposed head 78. The inner end of the bolt 75 passes through the inner wall 79 of the die member 23ᵇ and is received in a groove 81 in the gripping element 37ᵇ, the upper end of said groove tapering outwardly as indicated at 82, until its lower surface merges with the outer cylindrical surface of the element 37ᵇ, as shown most clearly in Figure 13.

The inner end of the bolt 75 normally engages said tapered surface and is urged by the surrounding spring 83 acting on the nut 77 to press the corresponding element 37ᵇ toward its associated element 38ᵇ, to hold the lead wires received therebetween with the desired gripping action, in accordance with the adjustment of the bolt 75 with respect to its nut 77, until release of the pressure by upward movement of the member 36ᵇ to a position where it escapes from the pressure of the bolt 75 by the nut engaging the adjacent surface of the wall 79 of the die 23ᵇ and arresting further inward movement of the bolt.

The rod 36ᵇ with its bifurcated head, forming the gripping elements 37ᵇ and 38ᵇ takes the place of the rod 57 and the separate gripping elements 37ᵃ and 38ᵃ of the preceding embodiment. The bolt 75, spring 83 and nut 77 take the place of the converging walls of the cavity 35ᵃ, of the preceding embodiment, for pressing the gripping elements 37ᵇ and 38ᵇ into clamping engagement with the lead wires.

It will, of course, be understood that a spring and rod-supported collar, corresponding with those designated by the reference characters 68 and 66 of the preceding embodiment, are provided for holding the member 36ᵇ in the normal position, illustrated in Figure 11, and that a cam track, corresponding with that designated 55ᵃ in the preceding embodiment, is desirably provided for first releasing the pressure on the leads and raising the formed glass element from the die 23ᵇ, and then partly raising the die out of its guide 22ᵇ, as in the preceding embodiment. Parts not illustrated in the present embodiment are identical with those of the preceding embodiment and the method of use of the present embodiment is desirably otherwise identical with that of the preceding embodiment.

The foregoing disclosure relates particularly to the formation of articles from soft glass. When making articles from hard or low expansion glass, we propose to substitute tungsten or molybdenum lead-in wires, for such of dumet, nickel, or nickel-iron alloy, which would be used with soft glass. Otherwise the method of forming such articles would be identical with that previously described, except that beads of the same kind of glass are formed on the lead-in conductors, at the places where they would pass through the glass articles, prior to placing them in the dies and allowing the molten glass to flow therearound. The reason for this change in method is that while lead-in conductors for soft glass will be readily wet by such glasses when melted, the same does not apply to tungsten and molybdenum which are less readily wet by molten glass. It, therefore, becomes desirable to bead the portions to be consolidated with the glass at high temperatures so as to effect a strong union between the engaged surfaces.

From the foregoing disclosure, it will be seen that we have devised a method and apparatus for molding glass parts, in which the lead-in conductors and exhaust tubes are incorporated with the parts during the process of molding molten glass, thereby avoiding some of the subsequent steps previously employed, making certain of a vacuum tight seal where each lead-in conductor passes through the glass, and obviating the possibility of leakage along the conductors. Such leakage sometimes occurred when forming a part from a gob of plastic glass, because of failure of said gob to thoroughly wet the conductors passing therethrough. It will also be seen that we have devised a novel means for holding and releasing the lead-in conductors for said parts as desired, whereby said conductors may be held in proper position until the glass of the article has hardened therearound, whereupon article and conductors may be removed as a unit.

Although preferred embodiments of my invention have been disclosed, it will be understood that modifications may be made within the spirit and scope of the appended claims.

We claim:

1. Apparatus for molding glass with a conductor in place, comprising a lower mold element provided with upwardly flaring sides and a generally central aperture and adapted to receive molten glass, means receivable in said aperture for gripping said conductor therebetween, and holding it in place for molding glass therearound, means for delivering molten glass to said lower mold element, and an upper mold element tapered to telescope with said upwardly flaring sides with clearance allowing for the desired thickness of said glass and adapted to be forced down into said glass to cause the latter to rise in and fill the space between said elements, said upper mold element having a downwardly opening aperture adapted to receive the upper end portion of said conductor, said mold elements being separable after hardening of the glass to permit removal of the latter therefrom.

2. Apparatus for molding glass with a plurality of conductors in place, comprising a lower mold element provided with upwardly projecting sides and a generally central aperture, the upper portion of which aperture is enlarged to form an upwardly opening pocket, said mold being adapted to receive molten glass, means receivable in said pocket for gripping said conductors therebetween, and holding them in place for molding glass therearound, means for delivering molten glass to said lower mold element, and an upper mold element receivable between said sides and adapted to be forced down into said glass to within a predetermined distance of the lower mold element, in accordance with the thickness of the article desired, to cause said glass to rise in and fill the space between said mold elements, said upper mold element having downwardly opening pockets adapted to receive the upper end portions of said conductors, said mold elements being separable after hardening of the glass to permit removal of the latter therefrom.

3. Apparatus for molding glass with a conductor in place, comprising a lower mold element provided with upwardly projecting sides and a generally central aperture and adapted to receive molten glass, the upper portion of said aperture being enlarged to form a pocket, a pair of blocks fitting in said pocket and formed with complementary grooves for receiving and gripping a conductor therebetween and holding it in place for molding glass therearound, means for forcing said blocks into conductor-gripping engagement with one another, means for delivering molten glass to said lower mold element, and an upper mold element receivable between said sides adapted to be forced down into said glass to cause the latter to rise in and fill the space between said elements, said upper mold element having a downwardly opening pocket adapted to receive the upper end portion of said conductor, said mold elements being separable after hardening of the glass to permit removal of the latter therefrom.

4. Apparatus for molding glass with lead-in conductors in place, comprising a lower mold element provided with a generally central aperture, the upper portion of which is enlarged to form an upwardly flaring pocket, said mold element being adapted to receive molten glass, blocks receivable in said pocket and correspondingly tapered, for gripping such conductors therebetween when pulled downwardly, and releasing said conductors when forced upwardly in said pocket, means for delivering molten glass to said lower mold element, an upper mold element adapted to be forced down into said glass to cause the latter to rise in and fill the space between said elements, said upper mold element having downwardly opening pockets receiving the upper end portions of said conductors and means for forcing said blocks upwardly to release said conductors.

5. Apparatus for molding glass with lead-in conductors in place, comprising a lower mold element provided with a generally central aperture, the upper portion of which is enlarged to form a generally cylindrical pocket, said element being adapted to receive molten glass, a rod disposed in said mold aperture and having an enlarged head or plug portion adapted to reciprocate in said pocket, said enlarged portion being bifurcated and each bifurcation having complementary grooves so that said enlarged portion is adapted to receive such lead-in conductors, one of said bifurcations having an inclined side portion, said grooves being of such size that said lead-in conductors are normally loosely disposed therein, a bolt having its inner end adapted to engage said inclined side portion, and resilient means for pressing said bolt into engagement with said inclined portion when said enlarged portion is in normal lowermost position in said pocket, to cause the bifurcations to be pressed together to grip lead-in conductors therebetween, resilient means for holding said rod in lowermost position, means for delivering molten glass to said lower mold element, and an upper mold element adapted to be forced down into said glass to cause the latter to rise in and fill the space between said elements, said upper mold element having downwardly opening pockets receiving the upper end portions of said conductors, and means for forcing said rod upwardly to allow the bifurcations thereof to resiliently separate to release said conductors.

6. Apparatus for molding glass with lead wires in place, comprising a lower mold element provided with a generally central aperture, the upper portion of which is enlarged to form an upwardly flaring pocket, a guide in which said mold element reciprocates, said guide and mold element being adapted to receive molten glass, means for resiliently holding said mold in lowermost position in said guide, blocks receivable in said pocket and correspondingly tapered, for gripping wires therebetween when pulled downwardly, and releasing said wires when forced upwardly in said pocket, means for delivering molten glass to said lower mold element, an upper mold element adapted to be forced down into said glass to cause the latter to rise in and fill the space between said elements, an upper mold guide in which said upper mold element reciprocates and which is adapted to be forced down until the lower edge thereof is received in the upper end of said lower mold guide, said upper mold element having downwardly opening pockets receiving the upper end portions of said lead wires and a projection fitting a corresponding aperture between said blocks for forming an exhaust tube portion on the article being molded, and means for forcing said blocks upwardly to release said lead wires, raise said glass article out of said mold, and lift said mold in its guide.

7. Apparatus for molding glass with lead wires in place, comprising a lower mold element provided with a generally cylindrical pocket, a guide in which said mold element reciprocates, said guide and element being adapted to receive molten glass, a rod disposed in said mold aperture and having an enlarged head or plug portion adapted to reciprocate in said pocket, said enlarged portion being bifurcated and having grooves so that said enlarged portion is adapted to receive lead-in wires or pins, one of said bifurcations having an inclined side portion, said grooves being of such size that said lead-in wires are normally loosely disposed therein, a bolt having its inner end adapted to engage said inclined side portion, and resilient means for pressing said bolt into engagement with said inclined portion when said enlarged portion is in normal lowermost position in said pocket, to cause the bifurcations to be pressed together to grip lead wires therebetween, resilient means for holding said rod in lowermost position, means for delivering molten glass to said lower mold element, and an upper mold element adapted to be forced down into said glass to cause the latter to rise in and fill the space between said elements.

8. Apparatus for molding glass with a conductor in place, comprising a lower mold element with upstanding sides and provided with a pocket therebeneath and adapted to receive molten glass, means receivable in said pocket for holding said conductor in place while glass is molded therearound, and an upper mold element receivable between said sides and adapted to be forced down into molten glass contained in said lower mold element to cause the latter to rise in and fill the space between said elements, said mold elements being separable after hardening of the glass to permit removal of the latter therefrom.

9. Apparatus for molding glass with a conductor in place, comprising a lower mold element provided with a pocket and adapted to receive molten glass, means receivable in said pocket for holding a conductor in place while glass is molded therearound, a lower mold guide, an upper mold element adapted to be forced down into glass contained in said lower mold element to cause the latter to rise in and fill the space between said elements, an upper mold guide or stripper in which said upper mold element reciprocates, said guide being movable downwardly until the lower edge thereof is received in the upper end of said lower mold guide, said upper mold element having a projection passing into said pocket in said lower mold element for forming an exhaust tube portion on the article being molded, and means for releasing said conductor, raising the glass article out of the lower mold element, and lifting said element in its guide.

10. Apparatus for making a part of a lamp, comprising a lower mold element provided with a pocket and adapted to receive molten glass, means receivable in said pocket for holding a conductor in place while glass is molded therearound, an upper mold element adapted to be forced down into such glass contained in said lower mold element, to cause the latter to rise in and fill the space between said elements, said upper mold element having a projection passing into said pocket in the lower mold element to form an exhaust tube portion on the part being molded, and means for releasing the conductor to allow for raising the part out of the lower mold element.

11. Apparatus for making a part of a lamp, comprising a lower mold element provided with a pocket and adapted to receive molten glass, complementary grooved elements in said pocket for receiving conductors therebetween, screw means for clamping said elements in conductor-gripping relationship, an upper mold element adapted to be forced down into such glass contained in said lower mold element to cause the latter to rise in and fill the space between said elements, said screw means allowing for the release of said conductors to raise the part out of the lower mold element.

12. Apparatus for making a part of a lamp, comprising a lower mold element provided with a pocket and adapted to receive molten glass, complementary grooved elements in said pocket for receiving a conductor therebetween, screw means for clamping said elements in wire-gripping relationship, an upper mold element adapted to be forced down into such glass contained in said lower mold element to cause the latter to rise in and fill the space between said elements, said upper mold element having a projection passing into said pocket in the lower mold element to form an exhaust tube portion on the part being molded, said screw means allowing for the release of said conductor to raise the part out of the lower mold element.

13. Apparatus for making a part of a lamp, comprising a support, a guide member resting thereon, a lower mold element adapted to receive molten glass, vertically movable in said guide member, and resiliently held in a normally lowered position by spring means, a pair of blocks receivable in the lower portion of said lower mold element and formed with complementary grooves, for receiving and gripping a conductor therebetween and holding it in place for molding glass therearound, means for forcing said blocks into conductor-gripping engagement with one another, and an upper mold element adapted to be forced down into such glass, when received in lower mold element, to cause the latter to rise in and fill the space between said elements, said upper mold element having a downwardly opening pocket adapted to receive the upper end portion of said conductor.

14. Apparatus for making a part of a lamp, comprising a lower mold element provided with a pocket and adapted to receive molten glass, means receivable in said pocket for holding a conductor in place while glass is molded therearound, an upper mold element adapted to be forced down into such glass contained in said lower mold element, to cause the latter to rise in and fill the space between said elements, and means for releasing the conductor to allow for raising the part out of the lower mold element.

15. Apparatus for making a part of a lamp, comprising a support, a guide member resting thereon, a lower mold element adapted to receive molten glass, vertically movable in said guide member, a pair of blocks receivable in the lower portion of said lower mold element and formed with complementary grooves, for receiving and gripping a conductor therebetween and holding it in place for molding glass therearound, means for forcing said blocks into conductor-gripping engagement with one another, and an upper mold element adapted to be forced down into such glass, when received in lower mold element, to cause the latter to rise in and fill the space between said elements, said upper mold element having a downwardly opening pocket adapted to receive the upper end portion of said conductor.

HENRY K. RICHARDSON.
LOUIS D. MORAND.